J. SCHEMAN AND L. REINHART.
CORN HUSKER.
APPLICATION FILED NOV. 28, 1921. RENEWED SEPT. 5, 1922.

1,431,985.

Patented Oct. 17, 1922.

Inventors
Joseph Scheman,
Leonard Reinhart,
Eccleston & Eccleston,
Attorneys

Patented Oct. 17, 1922.

1,431,985

UNITED STATES PATENT OFFICE.

JOSEPH SCHEMAN AND LEONARD REINHART, OF COURTLAND, MINNESOTA.

CORN HUSKER.

Application filed November 28, 1921, Serial No. 518,475. Renewed September 5, 1922. Serial No. 586,363.

*To all whom it may concern:*

Be it known that we, JOSEPH SCHEMAN and LEONARD REINHART, citizens of the United States, residing at Courtland, in the county of Nicollet and State of Minnesota, have invented certain new and useful Improvements in Corn Huskers, of which the following is a full, clear, and exact description.

Our invention relates to corn huskers and has for its object to provide such a device which removes the husk from the corn, separates any loose grains of corn from the husks, and also loads the ears of corn and any loose grains onto a wagon or the like.

Another object of the invention is to provide such a device which is simple in construction and operation and which can be manufactured at comparatively low cost.

A still further object of the invention is the provision of novel means for agitating the corn husks as they come from the husking rolls in order to separate the loose grains of corn.

Other objects and advantages of the invention will be apparent from the following description when taken in connection with the accompanying drawings, in which, Figure 1 is a side elevation of the complete machine.

Figure 7 is a detail view showing the screen operating mechanism.

Figure 1:
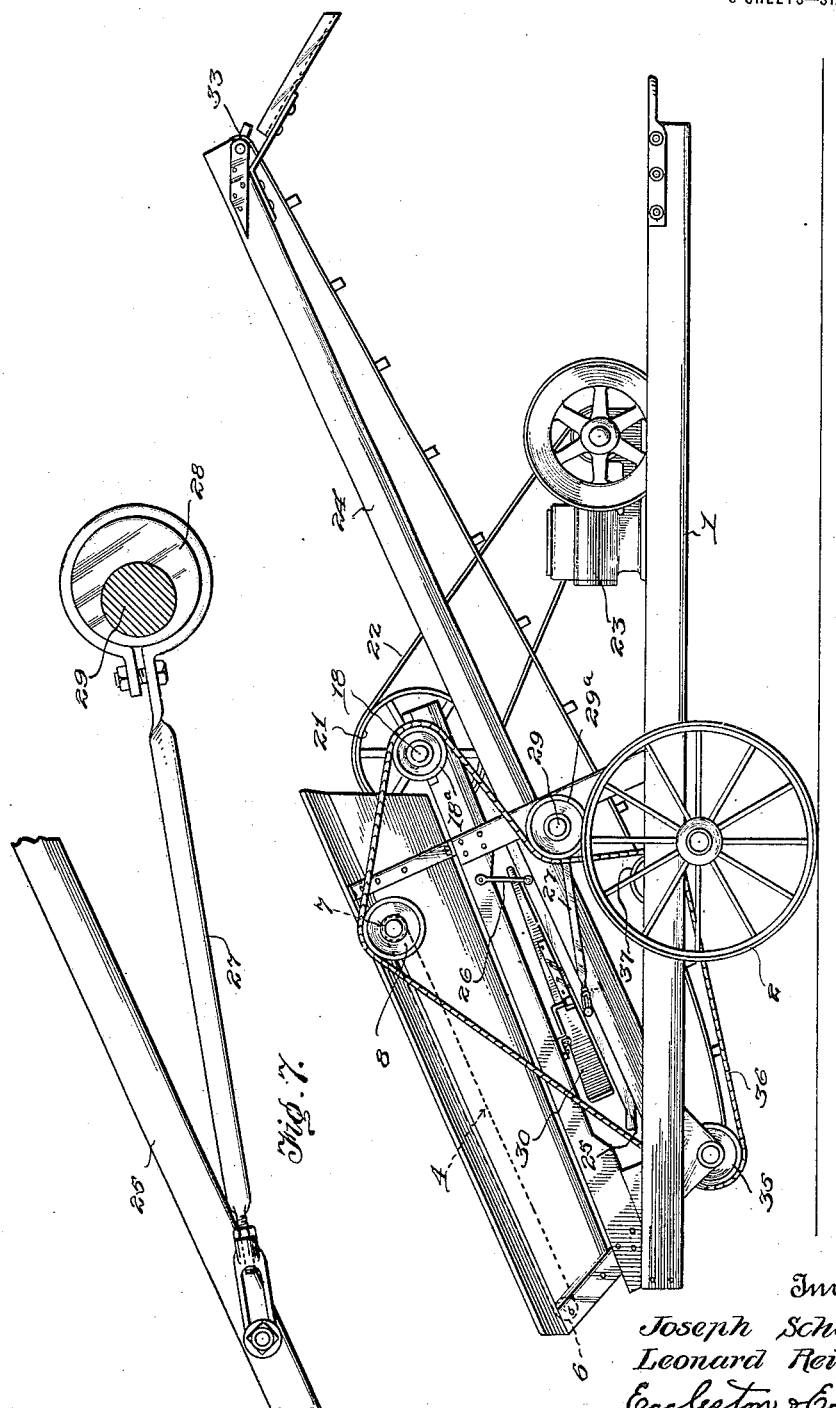
Figure 2:
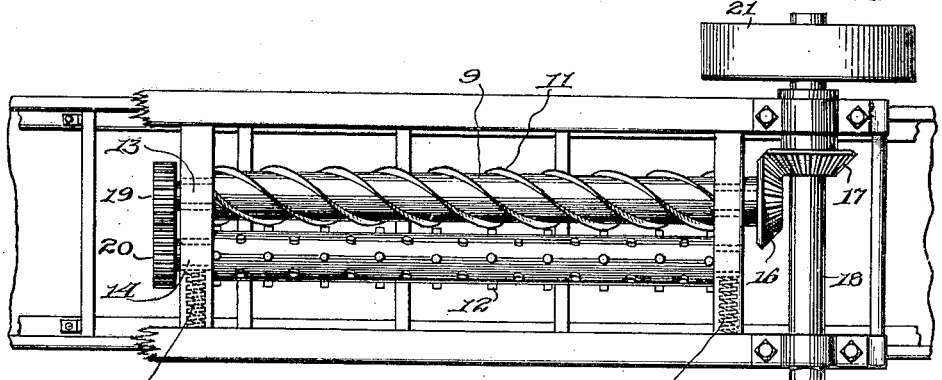
Figure 2 is a plan view of the husking rolls.
Figure 4:
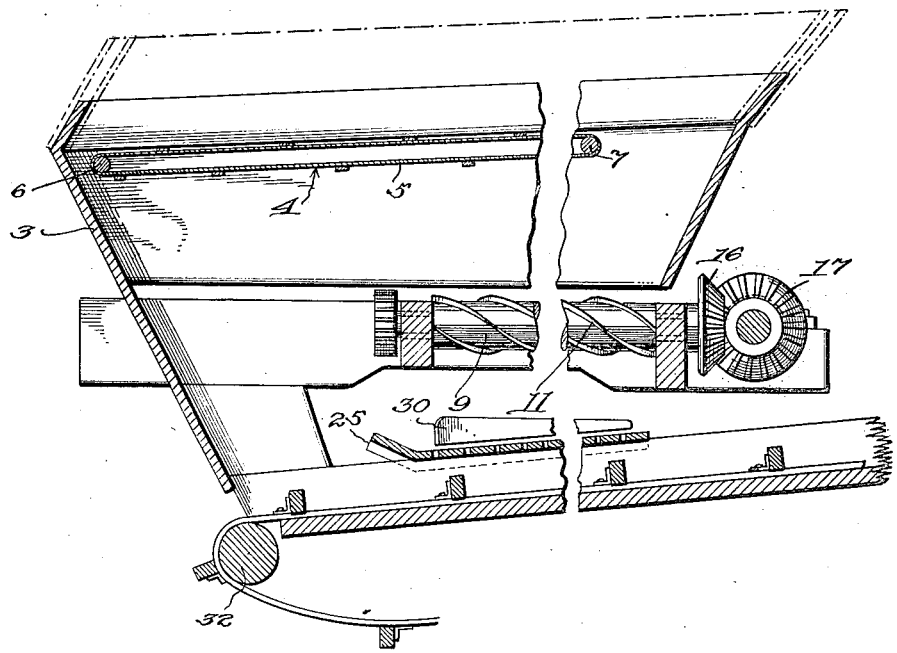
Figure 4 is a longitudinal vertical section through a portion of the machine.
Figure 3:
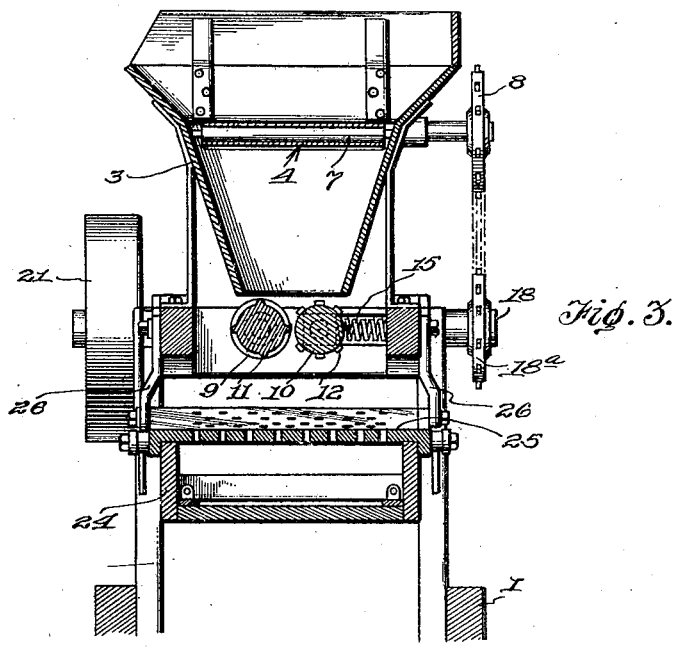
Figure 3 is a transverse vertical section through the apparatus.
Figure 5:
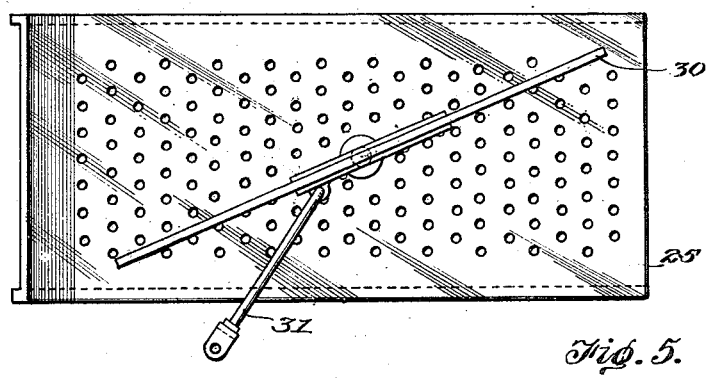
Figure 5 is a plan view of the screen and related parts.
Figure 6:
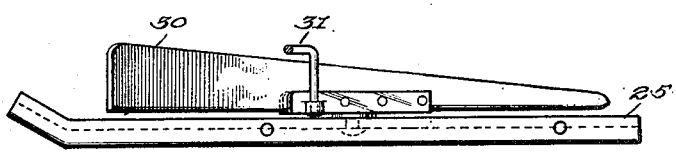
Figure 6 is a side elevation of the construction shown in Figure 5.

Referring to the drawings more in detail, the numeral 1 designates the main frame of the apparatus which is mounted on the wheels 2. Mounted on the frame 1 is the hopper 3 which inclines downwardly from front to rear and is provided with a conveyer or elevator 4 which carries the corn to the forward part of the hopper where it is dropped onto husking rolls to be later described. The elevator 4 comprises an endless belt 5 carried by rollers 6 and 7. Roller 7 is provided with a sprocket wheel 8 by means of which the elevator or conveyer is operated. Mounted below the hopper 3 are the husking rolls 9 and 10, the roll 9 being formed with the spiral knives 11, and the roll 10 with the pins 12. The rolls 9 and 10 are inclined downwardly from front to rear and have their ends mounted in suitable bearings 13 and 14. The roll 10 is yieldingly held in cooperative relation with the roll 9 by means of coil springs 15, thereby preventing damage to the rolls in the event of some hard object getting between the rolls. Roll 9 is operated by means of the bevel gear 16 mounted on one end thereof and which is in mesh with the bevel gear 17 carried on shaft 18. The opposite ends of the rolls 9 and 10 are provided with the meshing gears 19 and 20 whereby the roll 10 is operated. Shaft 18 is driven by means of the pulley 21 and belt 22 which are in turn driven by the motor 23.

Slidably mounted on the upwardly extending frame 24 is the sieve or screening device 25 which is further supported by the links or chains 26. The screen 25 is reciprocated along the frame 24 by means of the adjustable arm 27 which is strapped to the eccentric 28 on shaft 29. A paddle or agitator 30 is pivotally mounted on the screen 25, and spaced slightly therefrom. For the purpose of oscillating the paddle 30, a link 31 is provided; the link being pivotally attached at one end to the body frame (Fig. 1), and at the other end being pivotally attached to the paddle. It is thus obvious that as the screen is reciprocated the paddle will be oscillated.

The frame 24 is provided with rollers 32 and 33 at opposite ends thereof, and by means of these rollers the endless conveyer 34 is operated; roller 32 being provided with a sprocket 35 with which the chain 36 meshes for this purpose. Chain 36 also meshes with sprockets 8, 18ª, 29ª, 35 and guide roller 37 in order to transmit power to the respective shafts of the apparatus.

In operation, the corn is thrown onto the elevator 4 which carries it forwardly and upwardly and drops it on to the husking rolls 9 and 10. In traveling along these rolls the husk is removed from the ears of corn by means of the knives 11 and pins 12, and the ears are deposited on the conveyer 34 and moved thereby to a wagon or place of storage. The husks and any loose grains of corn associated therewith, pass through the rolls 9 and 10 and onto the screen 25. The reciprocation of the screen and oscillation of the paddle cause the grains of corn to pass through the perforations of the screen and onto the conveyer 34.

From the foregoing description it will be seen that we have provided a power driven machine which requires practically no attention other than the placing of the corn in the hopper 3, and further that the various parts of the machine are composed of as few elements as are consistent with the reliable performance of the work required.

In accordance with the patent statutes we have described what we now believe to be the best embodiment of the invention, but we do not wish to be understood thereby as limiting ourselves or the scope of the invention, as many changes and modifications may be made without departing from the spirit of the invention, all such we aim to include in the scope of the appended claims.

What we claim as new and desire to secure by Letters Patent is:

1. A corn husker including husking rolls, a conveyer for supplying the corn to the rolls, a screen located directly below the husking rolls for sifting the loose corn, and a single conveyer located below the husking rolls and screen for carrying off the husked ears and loose corn.

2. A corn husker including husking rolls, a conveyer for supplying the corn to the rolls, a screen located directly below the husking rolls for sifting the loose corn, a paddle mounted for movement over the screen, and a single conveyer located below the rolls and screen for carrying off the husked ears and loose corn.

3. A corn husker including husking rolls, a conveyer for supplying the corn to the rolls, a screen located below the rolls for sifting the loose corn, a paddle mounted for movement over and spaced from the screen, and conveyer located below the rolls and screen for carrying off the husked ears and loose corn.

4. A corn husker including husking rolls, a conveyer for supplying the corn to the rolls, a screen located below the husking rolls for sifting the loose corn, means for reciprocating said screen, a paddle mounted for movement over said screen, means for oscillating said paddle, and a conveyer below the rolls and screen for carrying off the ears and loose corn.

5. A corn husker including husking rolls, a conveyer for supplying the corn to the rolls, a screen located below the husking rolls for sifting the loose corn, means for reciprocating said screen, a paddle mounted for movement over and spaced from said screen, means for oscillating said paddle, and a conveyer below the rolls and screen for carrying off the ears and loose grain.

6. A corn husker including husking rolls, a screen located directly below the husking rolls for sifting the loose corn, means for reciprocating the screen, a paddle mounted on said screen, and means for oscillating the paddle in response to reciprocations of the screen, and means for receiving the husked ears and loose corn.

7. A corn husker including husking rolls, a screen located directly below the husking rolls for sifting the loose corn, means for reciprocating the screen, a paddle mounted on and spaced from said screen, and means for oscillating the paddle in response to reciprocations of the screen, and means for receiving the husked ears and loose corn.

8. A corn husker including husking rolls, a screen located below the husking rolls for sifting the loose corn, means for reciprocating the screen, a paddle mounted on said screen, and a pivotally mounted link connected with the paddle, whereby the latter is oscillated as the screen is reciprocated, and means for receiving the husked ears and loose corn.

JOSEPH SCHEMAN.
LEONARD REINHART.

Signed, sealed, and delivered in presence of—

W. H. DEMPSEY,
J. H. VOGEL.